US011179995B2

(12) United States Patent
Nakashima et al.

(10) Patent No.: US 11,179,995 B2
(45) Date of Patent: Nov. 23, 2021

(54) BLOWING DEVICE OF AIR CONDITIONER

(71) Applicant: HONDA MOTOR CO., LTD., Tokyo (JP)

(72) Inventors: Yu Nakashima, Wako (JP); Toru Okinaga, Wako (JP); Hiroshi Endo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/861,395

(22) Filed: Apr. 29, 2020

(65) Prior Publication Data
US 2020/0406706 A1 Dec. 31, 2020

(30) Foreign Application Priority Data

Jun. 25, 2019 (JP) .............................. JP2019-117423

(51) Int. Cl.
*B60H 1/00* (2006.01)
(52) U.S. Cl.
CPC ................................ *B60H 1/00464* (2013.01)
(58) Field of Classification Search
CPC .. B60H 1/00464; B60H 1/345; B60H 1/3428; B60H 1/00871; B60H 1/3421; B60H 1/34
See application file for complete search history.

(56) References Cited

U.S. PATENT DOCUMENTS

| | | | | |
|---|---|---|---|---|
| 6,494,780 | B1 * | 12/2002 | Norbury, Jr. ............ | F24F 13/06 454/155 |
| 10,099,536 | B2 * | 10/2018 | Albin ................... | B60H 1/3421 |
| 2008/0081550 | A1 * | 4/2008 | Shibata ................ | B60H 1/3421 454/155 |
| 2010/0304655 | A1 * | 12/2010 | Nagasaka ............ | B60H 1/3421 454/152 |
| 2014/0302769 | A1 * | 10/2014 | Sawada ................. | F24F 13/082 454/315 |

(Continued)

FOREIGN PATENT DOCUMENTS

| | | |
|---|---|---|
| JP | 02-002220 | 1/1990 |
| JP | 05-066447 | 9/1993 |

(Continued)

OTHER PUBLICATIONS

Japanese Office Action for Japanese Patent Application No. 2019-117423 dated Jan. 5, 2021.

*Primary Examiner* — Emmanuel E Duke
(74) *Attorney, Agent, or Firm* — Amin, Turocy & Watson, LLP

(57) ABSTRACT

A blowing device includes: a casing which is connected to an air conditioner of a vehicle; a ventilation path which is formed from an inlet to an outlet of the casing; a second inclined portion which is provided on the side of the outlet in the casing; an intermediate portion which is formed between the inlet and the second inclined portion; a wind direction variable member that is provided in the ventilation path and is able to change a wind direction of an inflow wind through the inlet toward the intermediate portion or the outlet; and a cover member that is provided with a hole portion penetrating therethrough in an X direction and the cover member is disposed in the +X direction in relation to an end portion of the second inclined portion in the −X direction.

1 Claim, 6 Drawing Sheets

(56) References Cited

U.S. PATENT DOCUMENTS

2017/0067422 A1\* 3/2017 O'Brien .......... F02M 35/10091
2019/0283544 A1  9/2019 Nakashima

FOREIGN PATENT DOCUMENTS

| JP | 2004-322981 | 11/2004 |
| JP | 2013-006587 | 1/2013 |
| JP | 2014-091376 | 5/2014 |
| JP | 2016-013758 | 1/2016 |
| JP | 2017-124830 | 7/2017 |
| WO | 2007/148658 | 12/2007 |
| WO | 2018/074022 | 4/2018 |

\* cited by examiner

BLOWING DEVICE OF AIR CONDITIONER

BACKGROUND OF THE INVENTION

Field of the Invention

The present invention relates to a blowing device of an air conditioner. Priority is claimed on Japanese Patent Application No. 2019-117423, filed Jun. 25, 2019, the content of which is incorporated herein by reference.

Description of Related Art

An air conditioner (an air conditioning unit) is mounted on a vehicle. Air adjusted by the air conditioner is blown out from a blowing device (register) into a vehicle compartment. The blowing device includes a wind direction variable member (a louver). The wind direction variable member is formed so that a wind direction can be changed in the left and right direction and the up and down direction of the vehicle.

Recently, a blowing device including an inclined surface in addition to a wind direction variable member has been proposed (for example, see PCT International Publication No. WO 2018/074022). This blowing device changes a wind direction toward the inclined surface using the wind direction variable member. Then, the blowing device blows out wind along the surface of the inclined surface.

SUMMARY OF THE INVENTION

In the above-described blowing device, there is room for improvement in increasing the blowing angle of the wind. An object of the present invention is to provide a blowing device of an air conditioner that can blow out wind over a wide angle.

In order to solve the above-described problems, a blowing device of an air conditioner of an aspect of the present invention adopts the following configuration. (1) The blowing device includes: a casing (for example, a casing 20 of the embodiment) which is connected to an air conditioner (for example, an air conditioner 3 of the embodiment) of a vehicle (for example, a vehicle 1 of the embodiment) through a duct (for example, a duct 5 of the embodiment); an inlet (for example, an inlet 50c of the embodiment) which is provided on the side of the duct of the casing and is connected to the duct; an outlet (for example, an outlet 50d of the embodiment) which is provided on the side of a vehicle compartment (for example, a vehicle compartment 1a of the embodiment) of the casing and is configured to blow out wind into the vehicle compartment; a ventilation path (for example, a ventilation path 50 of the embodiment) which is formed inside the casing so as to allow ventilation in a ventilation direction (for example, an X direction of the embodiment) from the inlet toward the outlet; an inclined portion (for example, a second inclined portion 52 of the embodiment) which is provided on the side of the outlet in the casing and is inclined in an inward direction of the casing toward the ventilation direction; an intermediate portion (for example, an intermediate portion 53 of the embodiment) which is formed between the inlet and the inclined portion; a wind direction variable member (for example, a wind direction variable member 40 of the embodiment) that is provided in the ventilation path and is able to change a wind direction of an inflow wind through the inlet toward the intermediate portion or the inclined portion; and a cover member (for example, a cover member 90 of the embodiment) that is provided with a hole portion (for example, a hole portion 92 of the embodiment) penetrating therethrough in the ventilation direction, wherein the cover member is disposed on a downstream side of the ventilation direction in relation to an end portion on the side of the inlet of the inclined portion.

According to this configuration, a part of the wind flowing into the ventilation path passes through at least a part of the inclined portion and collides with the cover member. The wind flows along the inside of the cover member and accelerates a flow velocity of a vortex inside the casing. Due to the influence of the wind and the vortex, the directivity in a wide angle direction of the wind blown out from the outlet becomes strong. For that reason, the wind blowing angle in the case with the cover member becomes larger than the wind blowing angle in the case without the cover member. Thus, the blowing device can blow out the wind over a wide angle.

(2) The cover member is disposed at an end portion on the side of the outlet of the inclined portion.

According to this configuration, a part of the wind flowing into the ventilation path passes through the entire inclined portion and collides with the cover member. Accordingly, the flow velocity of the wind flowing along the inside of the cover member becomes fast and the flow velocity of the vortex also becomes fast. For that reason, the directivity in a wide angle direction of the blown wind becomes strong and the wind blowing angle is increased. Thus, the blowing device can blow out the wind at a wider angle.

(3) The cover member includes a frame portion (for example, a frame portion 96 of the embodiment) without the hole portion and an inner peripheral portion (for example, an inner peripheral portion 96e of the embodiment) of the frame portion is disposed in an inward direction of the casing in relation to an inner peripheral portion (for example, an inner peripheral portion 50e of the embodiment) of the outlet.

According to this configuration, a part of the wind flowing into the ventilation path also collides with the frame portion of the cover member. Accordingly, the flow velocity of the wind flowing along the inside of the cover member becomes faster. Thus, the blowing device can blow out the wind at a wider angle.

According to the present invention, the blowing device of the air conditioner includes a cover member that is provided with a hole portion penetrating therethrough in the ventilation direction. The cover member is disposed on a downstream side of the ventilation direction in relation to an end portion on the side of the inlet of the inclined portion. Accordingly, the blowing device can blow out the wind over a wide angle.

DETAILED DESCRIPTION OF THE INVENTION

Hereinafter, embodiments of a blowing device of an air conditioner of the present invention will be described with reference to the accompanying drawings.

The X direction, the Y direction, and the Z direction used in the following description are defined as below. The X direction is an extension direction (ventilation direction) of a ventilation path formed inside a blowing device. The +X direction is an opening direction of an outlet formed on the downstream side of the ventilation path. The Y direction and the Z direction are directions orthogonal to each other and are respectively orthogonal to the X direction. As an example, when the cross-sectional shape of the ventilation path orthogonal to the X direction is rectangular, the long direction is the Y direction and the short direction is the Z direction. Further, as an example of a relationship with the vehicle, the X direction is the front and rear direction of the vehicle and the +X direction is a direction from the front to the rear of the vehicle. The Y direction is the left and right (width) direction of the vehicle and the +Y direction is a direction from the right to the left when facing forward in the vehicle. The Z direction is the up and down direction of the vehicle and the +Z direction is a direction from the bottom to the top of the vehicle. However, the X direction, the Y direction, and the Z direction are not limited to these examples.

First Embodiment

Figure 1:
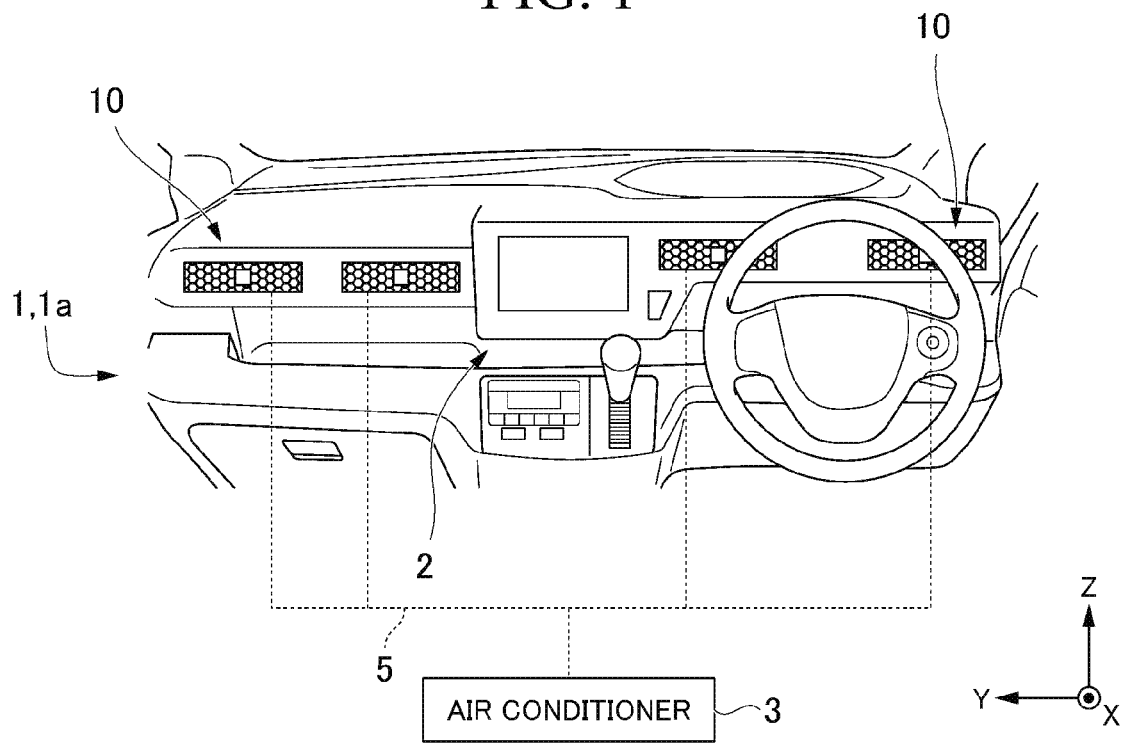
FIG. 1 is a front view of an instrument panel inside a vehicle compartment.
Figure 2:
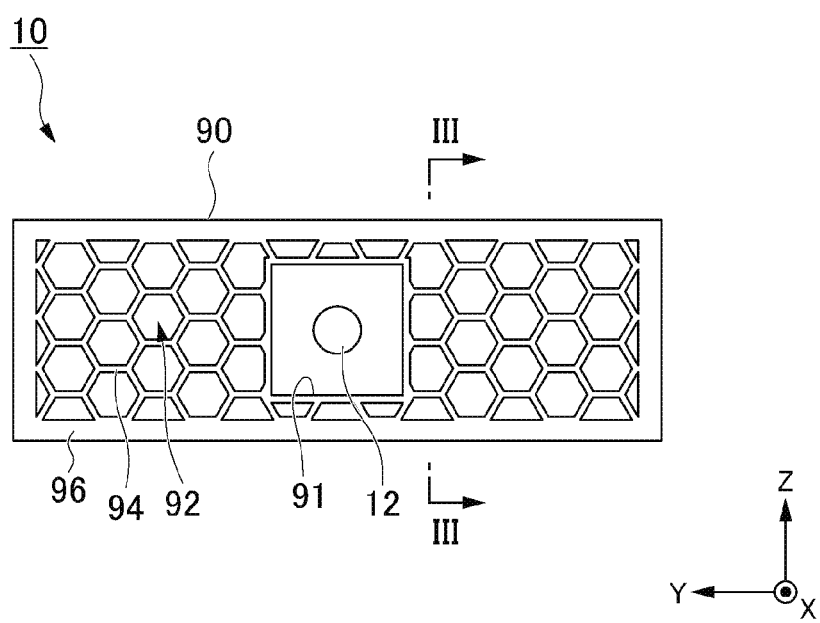
FIG. 2 is a front view of a blowing device of a first embodiment.

FIG. 1 is a front view of an instrument panel inside a vehicle compartment. FIG. 2 is a front view of a blowing device of a first embodiment. As shown in FIG. 1, a vehicle 1 includes an air conditioner 3. The air conditioner 3 adjusts the temperature or humidity of air in a vehicle compartment 1*a*. A blowing device (register) 10 is connected to the air conditioner 3 through a duct 5. Air adjusted by the air conditioner 3 is blown out from the blowing device 10 into the vehicle compartment 1*a*. The blowing device 10 is disposed in an instrument panel 2 inside the vehicle compartment 1*a* of the vehicle 1.

FIG. 2 is a front view of a blowing device of a first embodiment. The blowing device 10 includes a cover member 90 that is exposed into the vehicle compartment. The cover member 90 includes a plurality of hole portions 92 blowing wind. The appearance (design) of the blowing device 10 is improved by the cover member 90. The cover member 90 will be described in detail later.

Figure 3:
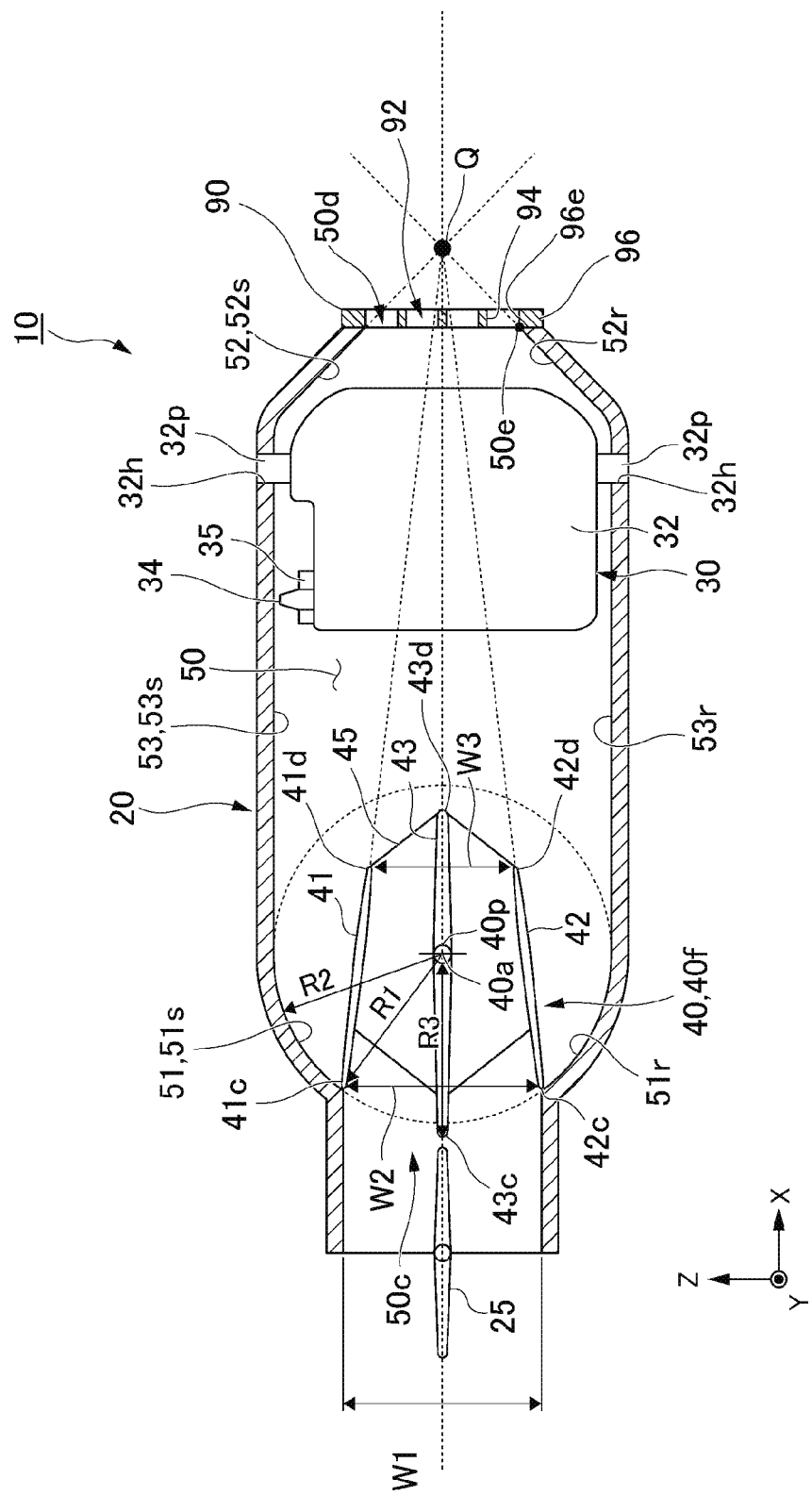
FIG. 3 is a cross-sectional view taken along a line of FIG. 2.

FIG. 3 is a cross-sectional view taken along a line of FIG. 2. As shown in FIG. 3, the blowing device 10 includes a casing 20, a shutoff valve 25, a louver 30, a wind direction variable member 40, and a cover member 90. Each member constituting the blowing device 10 is formed of a resin material, a metal material, or the like.

The casing 20 includes an inlet 50*c*, an outlet 50*d*, and a ventilation path 50. The inlet 50*c* is provided in an end portion (a duct side) of the casing 20 in the −X direction and is connected to the duct 5. The outlet 50*d* is provided in an end portion (a vehicle compartment side) of the casing 20 in the +X direction and blows out wind toward the inside of the vehicle compartment. The outlet 50*d* opens in the +X direction through a hole portion 92 of the cover member 90. The ventilation path 50 extends between the inlet 50*c* and the outlet 50*d* inside the casing 20. The ventilation path 50 is formed in the ventilation direction (the X direction) from the inlet 50*c* toward the outlet 50*d*. That is, the inlet 50*c* is formed on the upstream side of the ventilation path 50 in the ventilation direction and the outlet 50*d* is formed on the downstream side.

An inner surface of the casing 20 is provided with a first inclined portion 51, a second inclined portion (an inclined portion) 52, and an intermediate portion 53.

The first inclined portion 51 is formed adjacent to the downstream side of the inlet 50*c* in the casing 20. The first inclined portion 51 is inclined outward in the casing 20 toward the ventilation direction. That is, a first inclined portion 51*s* which is formed on the inner surface of the casing 20 in the +Z direction (the inner surface facing the −Z direction) is inclined in the +Z direction as it goes in the +X direction. Further, a first inclined portion 51*r* which is formed on the inner surface of the casing 20 in the −Z direction (the inner surface facing the +Z direction) is inclined in the −Z direction as it goes in the +X direction. The first inclined portion 51 is formed in a curved shape so as to have a circular-arc shape in a cross-section (for example, FIG. 3) perpendicular to the Y direction.

The second inclined portion 52 is provided adjacent to the upstream side of the outlet 50*d* in the casing 20. The second inclined portion 52 is inclined in an inward direction of the casing 20 toward the ventilation direction. That is, a second inclined portion 52*s* which is formed on the inner surface of the casing 20 in the +Z direction (the inner surface facing the −Z direction) is inclined in the −Z direction as it goes in the +X direction. Further, a second inclined portion 52*r* which is formed on the inner surface of the casing 20 in the −Z direction (the inner surface facing the +Z direction) is inclined in the +Z direction as it goes in the +X direction. The second inclined portion 52 is formed in a planar shape so as to have a linear shape in a cross-section (for example, FIG. 3) perpendicular to the Y direction.

The intermediate portion 53 is formed between the first inclined portion 51 and the second inclined portion 52. The intermediate portion 53 is formed in a planar shape and is disposed parallel to the XY plane. The intermediate portion 53 continuously connects the end portion of the first inclined portion 51 in the +X direction and the end portion of the second inclined portion 52 in the −X direction.

The ventilation path 50 of the casing 20 is provided with the shutoff valve 25, the wind direction variable member 40, and the louver 30. The shutoff valve 25 is disposed in the inlet 50*c*. The wind direction variable member 40 is disposed adjacent to the downstream side of the inlet 50*c*. The louver 30 is disposed adjacent to the upstream side of the second inclined portion 52.

The shutoff valve 25 is formed in a rectangular flat plate shape in which the Y direction is a long direction. The shutoff valve 25 is supported by the casing 20 so as to be rotatable around a rotation shaft parallel to the Y direction. The shutoff valve 25 adjusts the amount of wind flowing into the blowing device 10.

The louver 30 includes a plurality of blades 32 and a connection member 35. The blade 32 is formed in a substantially square plate shape. The plurality of blades 32 are arranged in parallel in the Y direction. A rotation pin 32p is provided upright at both end portions of the blade 32 in the Z direction. The rotation pin 32p is inserted into a hole 32h of the casing 20. Accordingly, the blade 32 is rotatably supported by the casing 20. A connection pin 34 is provided upright at an end portion of the blade 32 in the +Z direction and away from the rotation pin 32p. For example, the rotation pin 32p is disposed at an end portion in the +X direction and the connection pin 34 is disposed at an end portion in the −X direction so as to be away from the rotation pin 32p. The connection member 35 includes a plurality of holes. The connection pins 34 of the plurality of blades 32 are respectively inserted into the plurality of holes of the connection member 35. The plurality of blades 32 connected by the connection member 35 rotate in a synchronization manner. The louver 30 rotates the blade 32 so as to change the wind direction in the Y direction of the wind blown out from the outlet 50d.

As shown in FIG. 2, the blowing device 10 includes a knob 12. The knob 12 is connected to the blade 32 of the louver 30. The knob 12 passes through a knob opening 91 formed in the center of the cover member 90 and protrudes into the vehicle compartment. When the knob 12 is tilted in the Y direction, the blade 32 of the louver 30 rotates. Accordingly, the wind direction in the Y direction of the wind blown out from the blowing device 10 changes.

The wind direction variable member 40 includes a plurality of fins 40f and an end plate 45.

The plurality of fins 40f include a first fin 41, an intermediate fin 43, and a second fin 42 which are arranged side by side in the Z direction. Each of the plurality of fins 40f is formed in a rectangular flat plate shape in which the Y direction is the long direction. The end plate 45 is disposed parallel to the XZ plane. The end plate 45 is fixed to both end portions of the plurality of fins 40f in the Y direction. A rotation pin 40p is provided upright on the outer surface of the end plate 45 in the Y direction. The rotation pin 40p is inserted into the hole of the casing 20. Accordingly, the wind direction variable member 40 is supported by the casing 20 so as to be rotatable around the rotation axis 40a in parallel to the Y direction.

The knob 12 shown in FIG. 2 is connected to the wind direction variable member 40 through a link mechanism. When the knob 12 is tilted in the Z direction, the wind direction variable member 40 rotates. Accordingly, the wind direction in the Z direction of the wind blown out from the blowing device 10 changes.

As one of the rotation positions of the wind direction variable member 40, there is a position (position in FIG. 3) in which the first fin 41 and the second fin 42 are plane-symmetric with respect to the XY plane including the rotation axis 40a. This rotation position is referred to as a standard position of the wind direction variable member 40. Further, a state in which the wind direction variable member 40 is located at the standard position is referred to as a standard state of the wind direction variable member 40. Hereinafter, a configuration of the plurality of fins 40f in the standard state of the wind direction variable member 40 will be described.

The first fin 41 and the second fin 42 are disposed at both end portions of the wind direction variable member 40 in the Z direction. The first fin 41 is disposed at the end portion in the +Z direction and the second fin 42 is disposed at the end portion in the −Z direction. In the standard state of the wind direction variable member 40, the first fin 41 and the second fin 42 are inclined in an inward direction of the casing 20 toward the +X direction. That is, the first fin 41 is inclined in the −Z direction as it goes in the +X direction. Further, the second fin 42 is inclined in the +Z direction as it goes in the +X direction. Here, a gap between an end portion 41c of the first fin 41 in the −X direction and an end portion 42c of the second fin 42 in the −X direction is denoted by W2. Further, a gap between an end portion 41d of the first fin 41 in the +X direction and an end portion 42d of the second fin 42 in the +X direction is denoted by W3. The first fin 41 and the second fin 42 are formed so that W2 is larger than W3. In the cross-sectional view of FIG. 3, an intersection between the extension line of the second inclined portion 52s in the +Z direction and the extension line of the second inclined portion 52r in the −Z direction is denoted by Q. The intersection Q is disposed in the +X direction of the outlet 50d. At this time, an intersection between the extension line of the first fin 41 and the extension line of the second fin 42 matches Q.

As described above, the gap between the end portion 41c of the first fin 41 in the −X direction and the end portion 42c of the second fin 42 in the −X direction is denoted by W2. The opening width of the inlet 50c in the Z direction is denoted by W1. The first fin 41 and the second fin 42 are formed so that W2 is equal to or larger than W1.

The first inclined portion 51 of the casing 20 is formed in a curved shape along the rotation locus of the end portion 41c of the first fin 41 in the −X direction or the end portion 42c of the second fin 42 in the −X direction. The first inclined portion 51s is formed in a curved shape along the rotation locus of the end portion 41c in the −X direction of the first fin 41. That is, a distance R2 from the rotation axis 40a of the wind direction variable member 40 to the first inclined portion 51s is constant. Here, a distance from the rotation axis 40a to the end portion 41c of the first fin 41 in the −X direction is denoted by R1. The first inclined portion 51s is formed so that R2 is slightly larger than R1. Similarly, the first inclined portion 51r is formed in a curved shape along the rotation locus of the end portion 42c of the second fin 42 in the −X direction.

The intermediate fin 43 is disposed between the first fin 41 and the second fin 42 in the Z direction. The intermediate fin 43 is disposed parallel to the XY plane in the standard state of the wind direction variable member 40. The intermediate fin 43 is formed so as to be longer than the first fin 41 and the second fin 42 in the X direction. An end portion 43d of the intermediate fin 43 in the +X direction is disposed in the +X direction in relation to the end portion 41d of the first fin 41 in the +X direction and the end portion 42d of the second fin 42 in the +X direction. An end portion 43c of the intermediate fin 43 in the −X direction is disposed in the −X direction in relation to the end portion 41c of the first fin 41 in the −X direction and the end portion 42c of the second fin 42 in the −X direction. When the wind direction variable member 40 is rotated to maximum, the end portion 43c of the intermediate fin 43 in the −X direction comes into contact with the inner surface of the inlet 50c of the casing 20. Here, a distance from the rotation axis 40a to the end portion 43c of the intermediate fin 43 in the −X direction is denoted by R3. As described above, the distance from the rotation axis 40a to the first inclined portion 51s is denoted by R2. The intermediate fin 43 is formed so that R3 is larger than R2.

A wind direction control operation of the blowing device 10 will be described.

Figure 4:
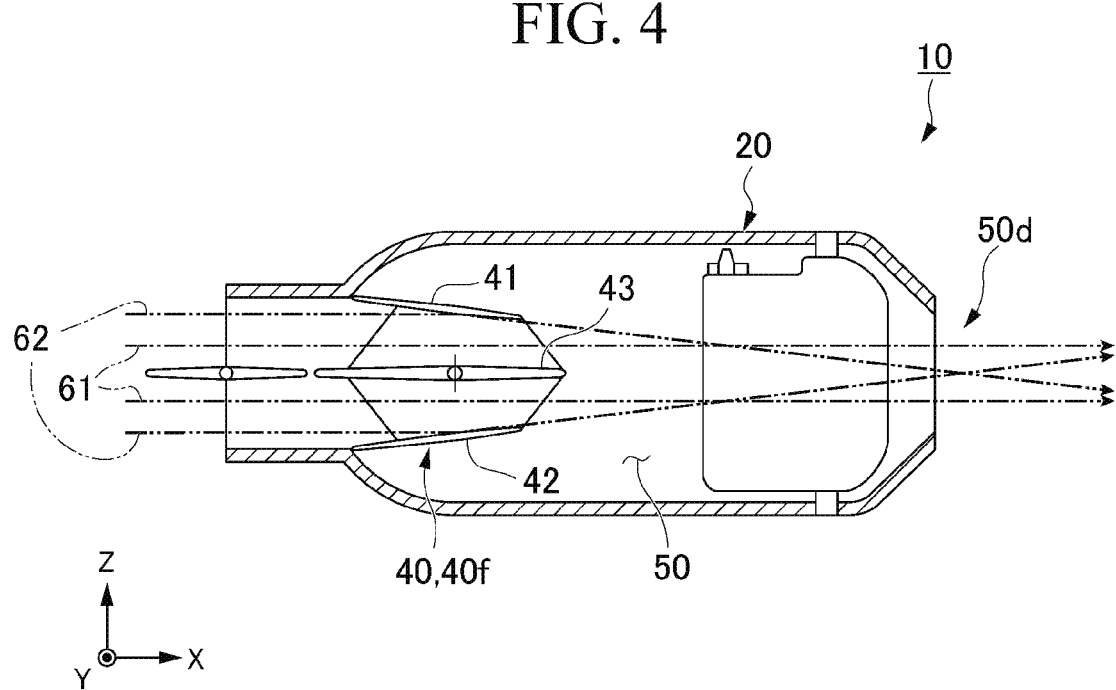
FIG. 4 is an explanatory diagram of a wind direction control operation of the blowing device in a state in which a wind direction variable member is rotated to a standard position.
Figure 5:
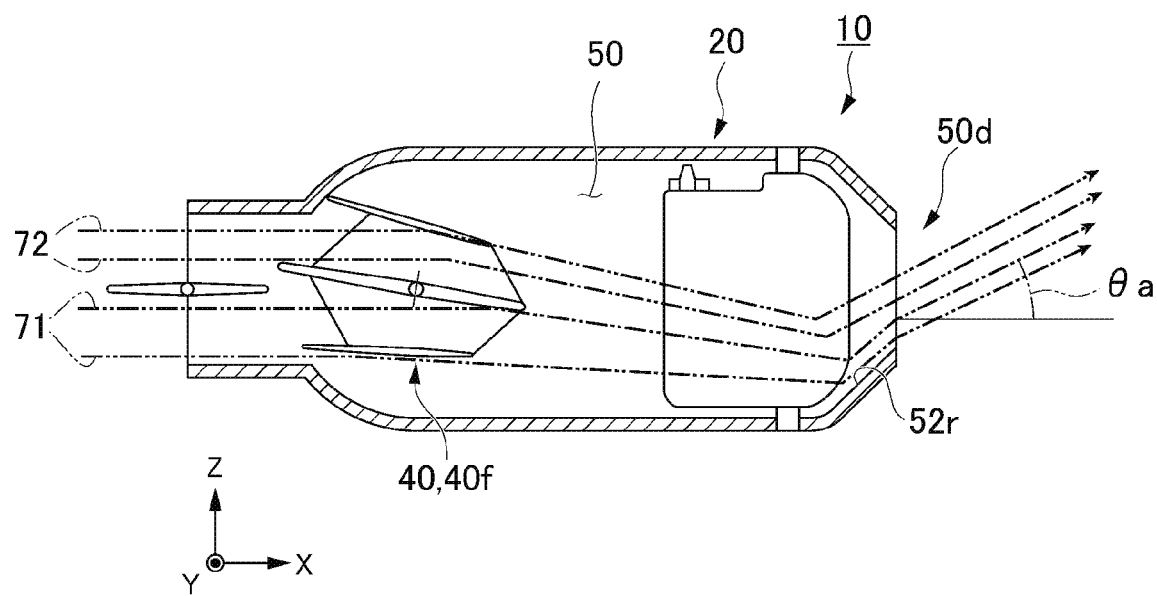
FIG. 5 is an explanatory diagram of the wind direction control operation of the blowing device in a state in which the wind direction variable member is rotated to an intermediate position.
Figure 6:
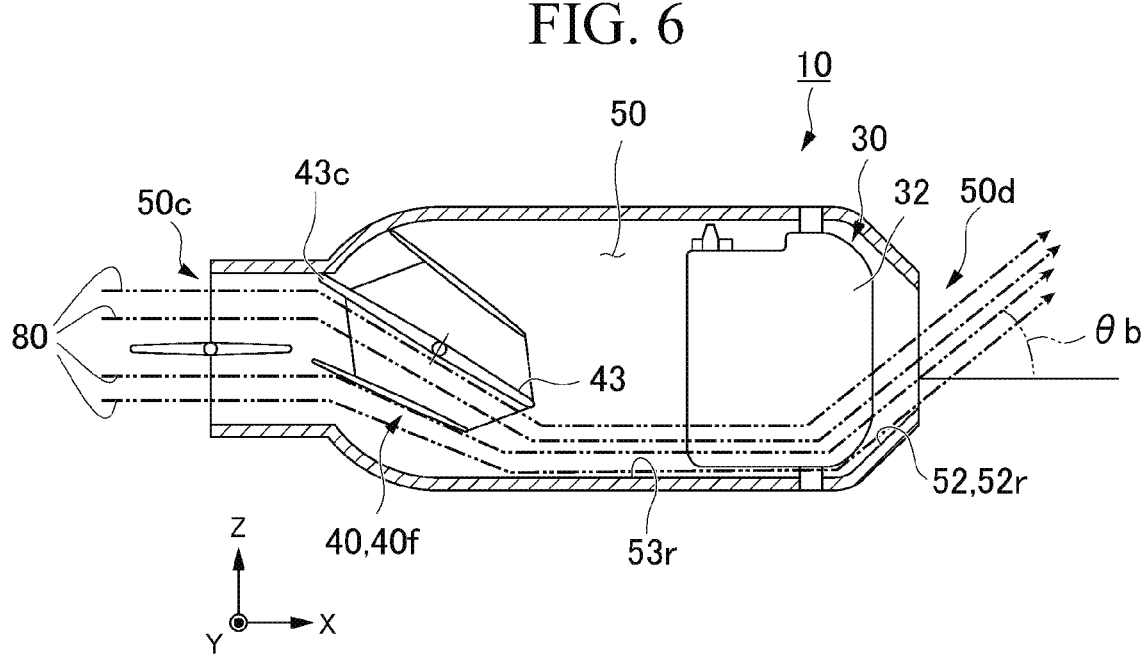
FIG. 6 is an explanatory diagram of the wind direction control operation of the blowing device in a state in which the wind direction variable member is rotated to a maximum position.

FIGS. 4, 5, and 6 are explanatory diagrams of the wind direction control operation of the blowing device. First, the wind direction control operation of the blowing device 10 in a state without the cover member 90 will be described. FIGS. 4, 5, and 6 show the blowing device 10 in a state without the cover member 90. FIG. 4 shows a state in which the wind direction variable member 40 is rotated to the standard position, FIG. 5 shows a state in which the wind direction variable member 40 is rotated to the intermediate position, and FIG. 6 shows a state in which the wind direction variable member 40 is rotated to the maximum position. Wind flows from the air conditioner 3 into the inlet 50c of the blowing device 10 through the duct 5 (see FIG. 1).

As shown in FIG. 4, the intermediate fin 43 is disposed parallel to the XY plane in a state in which the wind direction variable member 40 is rotated to the standard position. For that reason, the wind direction of wind 61 flowing into the center portion of the ventilation path 50 in the Z direction is not changed by the intermediate fin 43. The wind 61 passes through the ventilation path 50 without colliding with the inner surface of the casing 20 and is blown out from the outlet 50d in the +X direction. In contrast, the first fin 41 and the second fin 42 are inclined in an inward direction of the casing 20 toward the +X direction. For that reason, the wind direction of wind 62 flowing into both end portions of the ventilation path 50 in the Z direction is changed toward the inside of the casing 20 by the first fin 41 and the second fin 42. However, since the inclination angles of the first fin 41 and the second fin 42 are small, an angle at which the wind direction is changed is small. Thus, the wind 62 passes through the ventilation path 50 without colliding with the inner surface of the casing 20 and is blown out from the outlet 50d.

As shown in FIG. 5, in a state in which the wind direction variable member 40 is rotated to the intermediate position, the plurality of fins 40f are inclined in the same direction. In an example of FIG. 5, the plurality of fins 40f are inclined in the −Z direction toward the +X direction. For that reason, the wind direction of the wind flowing into the ventilation path 50 is changed to a direction inclined in the −Z direction toward the +X direction by the plurality of fins 40f. Since the wind direction of wind 71 flowing into the −Z direction (the lower half) of the ventilation path 50 is changed in this way, the wind collides with the second inclined portion 52r in the −Z direction. The wind direction of the wind 71 is changed to a direction along the surface of the second inclined portion 52r (a direction inclined in the +Z direction toward the +X direction). In contrast, even when the wind direction of wind 72 flowing into the +Z direction (the upper half) of the ventilation path 50 is changed to a direction inclined in the −Z direction toward the +X direction, the wind does not collide with the second inclined portion 52r. However, the wind direction of the wind 72 is changed to a direction inclined in the +Z direction toward the +X direction due to the influence of the wind 71 of which the wind direction is changed to a direction along the second inclined portion 52r. Accordingly, the wind 71 and the wind 72 are blown out from the outlet 50d toward a direction inclined in the +Z direction toward the +X direction.

As shown in FIG. 6, in a state in which the wind direction variable member 40 is rotated to the maximum position, the end portion 43c of the intermediate fin 43 in the −X direction comes into contact with the inner surface of the inlet 50c of the casing 20. In this state, the plurality of fins 40f are largely inclined in the same direction. In an example of FIG. 6, the plurality of fins 40f are largely inclined in the −Z direction toward the +X direction. For that reason, the wind direction of wind 80 flowing into the ventilation path 50 is largely changed to a direction inclined in the −Z direction toward the +X direction by the plurality of fins 40f. The wind 80 collides with the intermediate portion 53r of the casing 20 in the −Z direction and flows along the surface of the intermediate portion 53r. Furthermore, the wind direction of the wind 80 is changed to a direction along the surface of the second inclined portion 52r. Then, the wind 80 is blown out from the outlet 50d toward a predetermined direction along the surface of the second inclined portion 52r. The wind blowing angle (the angle with respect to the +X direction) θb in the case of FIG. 6 is larger than the wind blowing angle θa in the case of FIG. 5.

In this way, in the blowing device 10 of this embodiment, the wind direction variable member 40 and the second inclined portion 52 determine the wind direction in the Z direction. The wind direction in the Z direction is changed by rotating the plurality of fins 40f of the wind direction variable member 40. Accordingly, the blowing device 10 can be decreased in thickness. Further, since the wind is blown out along the second inclined portion 52, it is possible to blow out the wind over a high angle range. Further, when the blowing device 10 is viewed from the vehicle compartment, the cover member 90 is visible and the inside of the casing 20 is not visible. Thus, the design of the blowing device 10 can be improved.

The cover member 90 will be described in detail.

As shown in FIG. 3, the cover member 90 is formed in a plate shape by a metal material or the like. The cover member 90 includes a plurality of hole portions 92 penetrating therethrough in the X direction. As shown in FIG. 2, the hole 92 is formed in, for example, a regular hexagonal shape. The plurality of holes 92 are arranged in a tortoise-shell pattern combining, for example, regular hexagons. However, the shape of the hole 92 is not limited to a regular hexagon, but may be a square or a circle. A hole frame portion 94 is formed between the adjacent hole portions 92. The peripheral edge portion of the cover member 90 is provided with a frame portion 96 without the hole portion 92. In this way, the cover member 90 is formed in a mesh shape including the plurality of hole portions 92.

As shown in FIG. 3, the cover member 90 is disposed in the +X direction (the downstream side of the ventilation direction) in relation to the end portion of the second inclined portion 52 in the −X direction (the side of the inlet 50c). That is, at least a part of the second inclined portion 52 is disposed in the −X direction of the cover member 90. In the embodiment, the cover member 90 is disposed at the end portion in the +X direction (the side of the outlet 50d) of the second inclined portion 52. That is, the entire second inclined portion 52 is disposed in the −X direction of the cover member 90. The cover member 90 is disposed so as to cover the outlet 50d. The outlet 50d opens into the vehicle compartment through the plurality of hole portions 92 of the cover member 90.

The cover member 90 includes the frame portion 96 without the hole portion 92. The frame portion 96 is fixed to the end portion of the casing 20 in the +X direction by adhering or the like. Accordingly, the cover member 90 is fixed to the casing 20. An inner peripheral portion 96e of the frame portion 96 of the cover member 90 is disposed at the same position as that of an inner peripheral portion 50e of the outlet 50d. In addition, the inner peripheral portion 96e of the frame portion 96 may be disposed in an outward direction of the casing 20 in relation to the inner peripheral portion 50e of the outlet 50d. That is, the inner peripheral portion 96e of the frame portion 96 is not disposed in an inward direction of the casing 20 in relation to the inner peripheral portion 50e of the outlet 50d. Accordingly, the outlet 50d is covered by the hole portion 92 and the hole frame portion 94 of the cover member 90 and is not covered by the frame portion 96.

Figure 7:
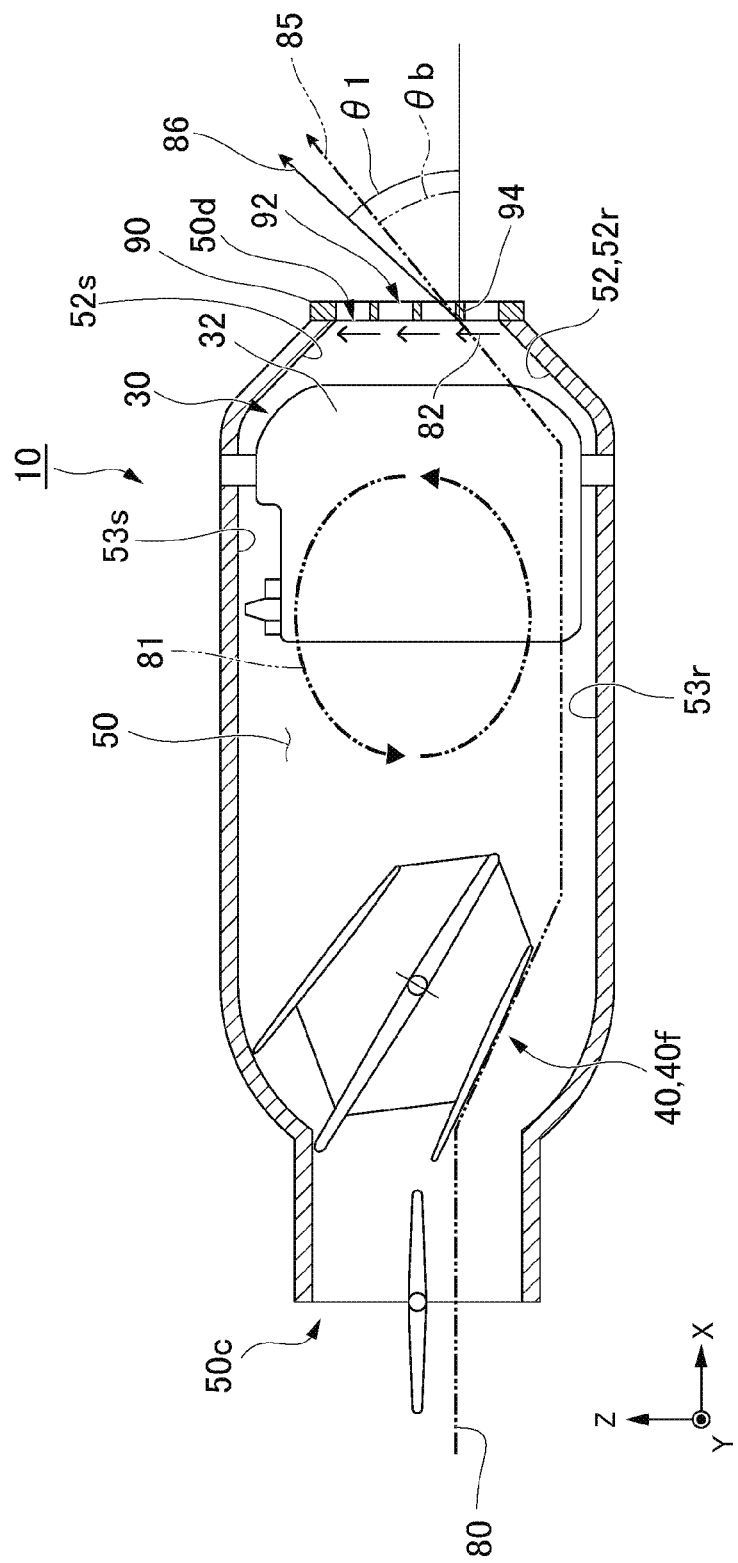
FIG. 7 is an explanatory diagram of an operation of the blowing device of the first embodiment.

FIG. 7 is an explanatory diagram of an operation of the blowing device of the first embodiment. FIG. 7 shows a state in which the wind direction variable member 40 is rotated to the maximum position. In the +X direction of the blowing device 10 in FIG. 7, the blowing direction of wind 85 in the case without the cover member 90 is indicated by a two-dot chain line arrow. In the +X direction of the blowing device 10 in FIG. 7, the blowing direction of wind 86 in the case with the cover member 90 is indicated by a solid arrow.

When the blowing device 10 blows out the wind, a vortex 81 is generated inside the casing 20.

In an example of FIG. 7, the end portions of the plurality of fins 40f in the +X direction are rotated to the maximum position in the −Z direction. At this time, the wind direction of the wind 80 flowing into the ventilation path 50 is changed by the wind direction variable member 40 and the wind flows in the +X direction along the surface of the intermediate portion 53r in the −Z direction. Most of the wind 80 passes through the second inclined portion 52r in the −Z direction and is blown out from the outlet 50d. However, a part of the wind 80 is not blown out from the outlet 50d, passes through the second inclined portion 52s in the +Z direction, and stays inside the casing 20. The wind 80 that has not been blown out flows in the −X direction along the surface of the intermediate portion 53s in the +Z direction. Accordingly, the vortex 81 is generated in a region in the +X direction and the +Z direction inside the casing 20. In addition, a part of the wind 80 does not blow out from the outlet 50d and stays inside the casing 20 regardless of the presence or absence of the cover member 90. For that reason, the vortex 81 is generated regardless of the presence or absence of the cover member 90.

The blowing device 10 of the embodiment includes the cover member 90 provided with the hole portion 92 penetrating therethrough in the X direction. The cover member 90 is disposed in the +X direction in relation to the end portion of the second inclined portion 52 in the −X direction. Accordingly, a part of the wind 80 passes through at least a part of the second inclined portion 52 and collides with the hole frame portion 94 of the cover member 90. The wind 82 colliding with the hole frame portion 94 flows along the inside of the hole frame portion 94 in the +Z direction and stays inside the casing 20. The flow velocity of the vortex 81 is accelerated by the wind 82. Due to the influence of the wind 82 and the vortex 81, the directivity in the +Z direction of the wind 86 blown out from the outlet 50d becomes stronger. For that reason, the blowing angle θ1 of the wind 86 in the case with the cover member 90 becomes larger than the blowing angle θb of the wind 85 in the case without the cover member 90. Thus, the blowing device 10 of the embodiment can blow out wind over a wide angle. Further, the appearance of the blowing device 10 is improved by the cover member 90.

The cover member 90 is disposed at the end portion of the second inclined portion 52 in the +X direction.

Accordingly, a part of the wind 80 passes through the entire second inclined portion 52 and collides with the hole frame portion 94 of the cover member 90. Accordingly, the flow velocity of the wind 82 flowing in the +Z direction becomes fast and the flow velocity of the vortex 81 also becomes fast. For that reason, the directivity in the +Z direction of the blown wind 86 becomes stronger and the blowing angle θ1 of the wind 86 also increases. Thus, the blowing device 10 can blow out the wind at a wider angle.

Second Embodiment

Figure 8:
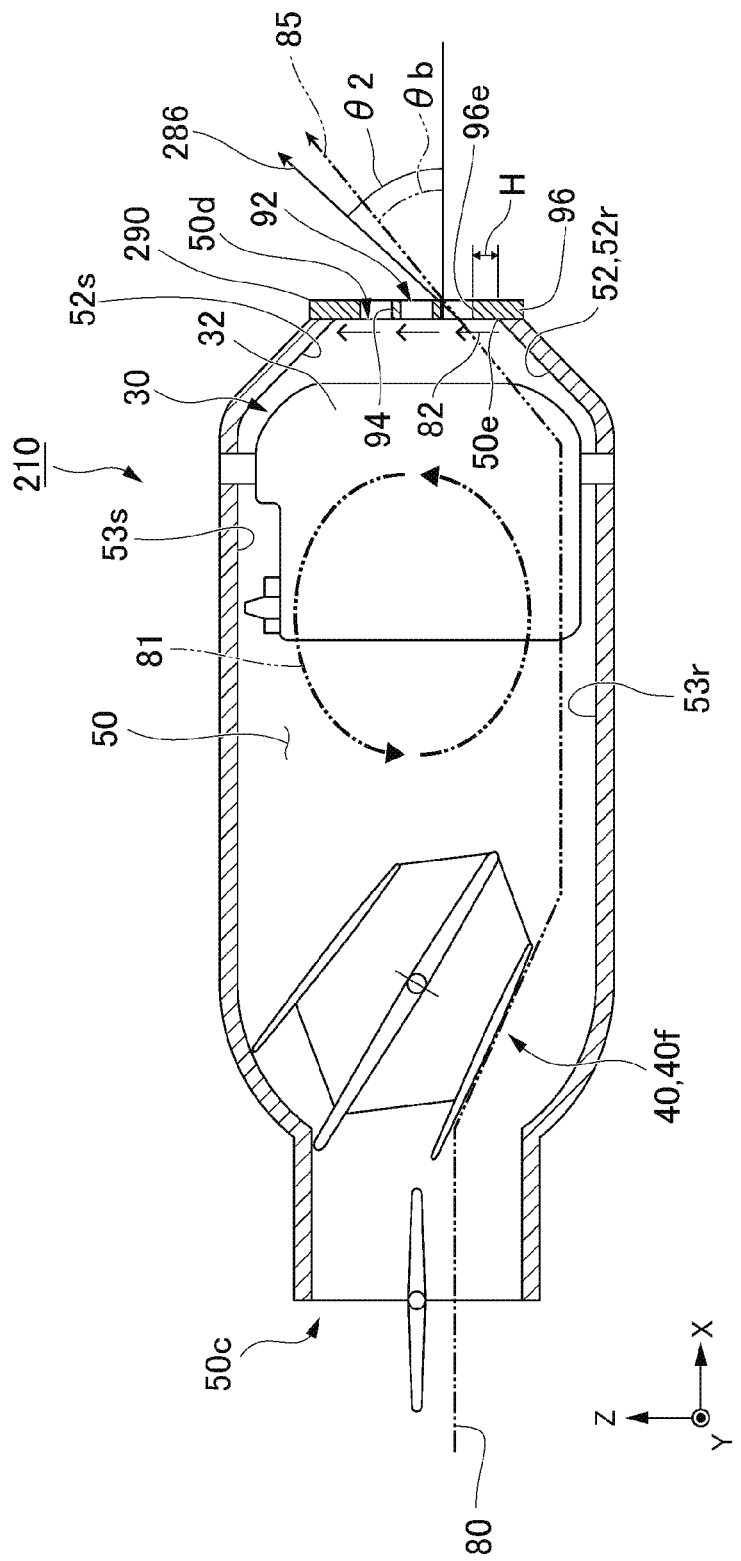
FIG. 8 is an explanatory diagram of an operation of a blowing device of a second embodiment.

FIG. 8 is an explanatory diagram of an operation of a blowing device of a second embodiment. FIG. 8 shows a state in which the wind direction variable member 40 is rotated to a maximum position. In the +X direction of a blowing device 210 in FIG. 8, the blowing direction of the wind 85 in the case without a cover member 290 is indicated by a two-dot chain line arrow. In the +X direction of the blowing device 210 in FIG. 8, the blowing direction of the wind in the case with the cover member 290 is indicated by a solid arrow.

In the blowing device 210 of the second embodiment, the position of the inner peripheral portion 96e of the frame portion 96 of the cover member 290 is different from that of the first embodiment. The description of the blowing device 210 of the second embodiment which is common to the first embodiment will be omitted.

The width of the frame portion 96 of the cover member 290 of the second embodiment is wider than the width of the frame portion 96 of the cover member 90 of the first embodiment. The inner peripheral portion 96e of the frame portion 96 of the cover member 290 is disposed in an inward direction of the casing 20 by a distance H in relation to the inner peripheral portion 50e of the outlet 50d. Accordingly, an inner portion of the inner peripheral portion 50e of the outlet 50d is covered with an outer portion of the inner peripheral portion 96e of the frame portion 96.

A part of the wind 80 flowing into the ventilation path 50 also collides with the frame portion 96 in addition to the hole frame portion 94 of the cover member 290. Accordingly, the flow velocity of the wind 82 flowing in the +Z direction becomes fast and the flow velocity of the vortex 81 also becomes fast. For that reason, the directivity in the +Z direction of the blown wind 286 becomes stronger and the blowing angle θ2 of the wind 286 becomes larger. The blowing angle θ2 of the wind 286 in the case with the cover member 290 becomes larger than the blowing angle θb of the wind 85 in the case without the cover member 290. Further, the blowing angle θ2 of the wind 286 in the case with the cover member 290 of the second embodiment becomes larger than the blowing angle θ1 of the wind 86 in the case with the cover member 90 of the first embodiment shown in FIG. 7. Thus, the blowing device 210 can blow out the wind at a wider angle.

Additionally, the technical scope of the present invention is not limited to the above-described embodiments and includes various modifications of the above-described embodiments without departing from the spirit of the present invention. That is, the configuration of the above-described embodiment is merely an example and can be appropriately modified.

In the embodiments, as an example of the blowing device, a case in which the long direction is the Y direction and the short direction is the Z direction when the cross-sectional shape orthogonal to the X direction of the ventilation path is rectangular has been exemplified. Further, as an example of a relationship with the vehicle, a case in which the Y direction is the left and right (width) direction of the vehicle and the Z direction is the up and down direction of the vehicle has been exemplified. In this case, a horizontally long blowing device is applied to the vehicle. Accordingly, the design is improved.

On the other hand, a vertically long blowing device may be applied to the vehicle. In this case, the Y direction is the up and down direction of the vehicle and the Z direction is the left and right (width) direction of the vehicle. When the vertically long blowing device is applied to the vehicle, a space in the vehicle width direction can be saved. That is, it is possible to provide the blowing device suitable for the vehicle having a lot of restrictions on the space in the vehicle width direction.

In the embodiments, as an example of the blowing device, a case in which the long direction is the Y direction and the short direction is the Z direction when the cross-sectional shape orthogonal to the X direction of the ventilation path is rectangular has been exemplified. On the contrary, the short direction may be the Y direction and the long direction may be the Z direction. Further, the blowing device of this embodiment can be applied even when the cross-sectional shape orthogonal to the X direction of the ventilation path is a square.

EXPLANATION OF REFERENCES

X Ventilation direction
1 Vehicle
1a Vehicle compartment
3 Air conditioner
5 Duct
10 Blowing device
20 Casing
40 Wind direction variable member
50 Ventilation path
50c Inlet
50d Outlet
50e Inner peripheral portion
52 Second inclined portion (inclined portion)
53 Intermediate portion
90 Cover member
92 Hole portion
96 Frame portion
96e Inner peripheral portion.

What is claimed is:

1. A blowing device of an air conditioner, comprising:
a casing which is connected to an air conditioner of a vehicle through a duct;
an inlet which is provided on the side of the duct of the casing and is connected to the duct;
an outlet which is provided on the side of a vehicle compartment of the casing and is configured to blow out wind into the vehicle compartment;
a ventilation path which is formed inside the casing and is capable of ventilating in a ventilation direction from the inlet toward the outlet;
an inclined portion which is provided on the side of the outlet in the casing and is inclined in an inward direction of the casing toward the ventilation direction;
an intermediate portion which is formed between the inlet and the inclined portion;
a wind direction variable member that is provided in the ventilation path and is capable of changing a wind direction of an inflow wind through the inlet toward the intermediate portion or the inclined portion; and
a cover member that is provided with a plurality of hole portions penetrating therethrough in the ventilation direction,
wherein the cover member is disposed on a downstream side of the ventilation direction in relation to an end portion on the side of the inlet of the inclined portion, wherein the cover member includes a frame portion without a hole portion, wherein the frame portion is fixed to the inclined portion, and wherein an inner peripheral portion of the frame portion is disposed in an inward direction of the casing in relation to an end portion on the side of the outlet of the inclined portion.

* * * * *